Feb. 11, 1930. W. E. WINE Re. 17,592
SIDE SILL
Original Filed Nov. 8, 1926 2 Sheets-Sheet 1
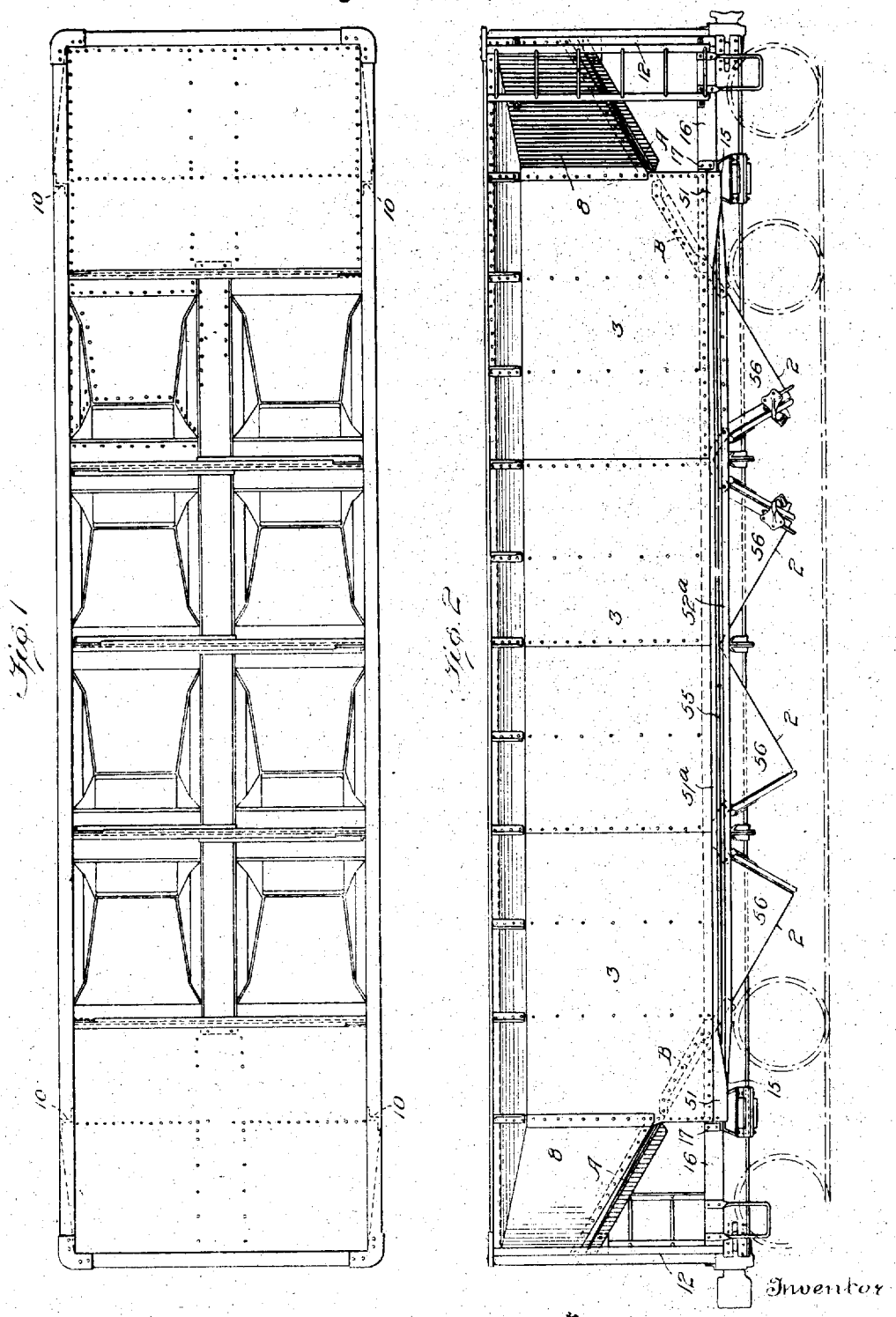
Inventor
William E. Wine
By Ritter & Mechlin his Attorneys Feb. 11, 1930. W. E. WINE Re. 17,592
SIDE SILL
Original Filed Nov. 8, 1926 2 Sheets-Sheet 2
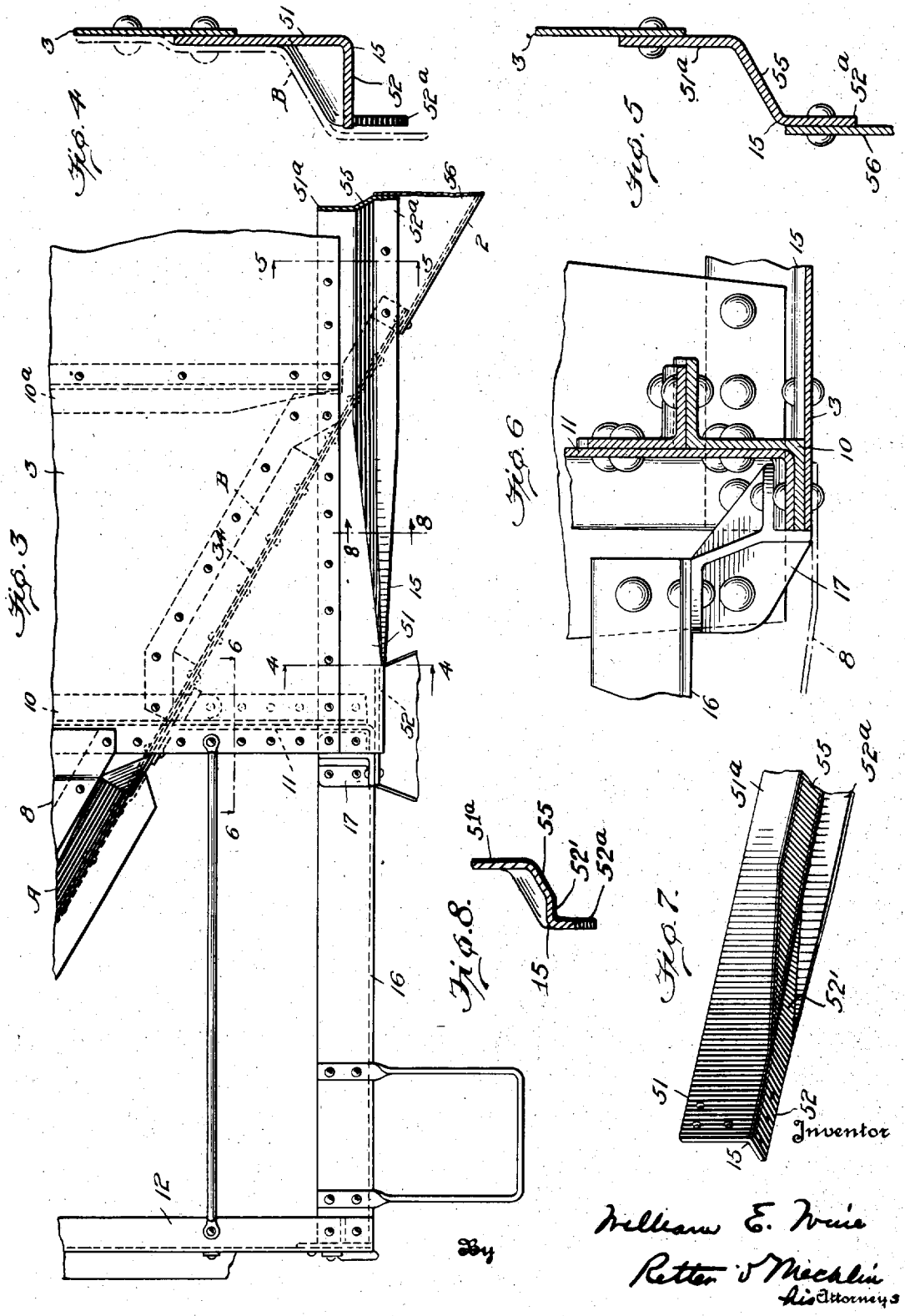

Reissued Feb. 11, 1930 Re. 17,592

UNITED STATES PATENT OFFICE

WILLIAM E. WINE, OF TOLEDO, OHIO, ASSIGNOR TO WINE RAILWAY APPLIANCE COMPANY, OF TOLEDO, OHIO, A CORPORATION OF OHIO

SIDE SILL

Original application filed November 8, 1926, Serial No. 146,977. Patent No. 1,703,756, dated February 26, 1929. Divided and application filed January 31, 1928, Serial No. 250,781. Patent No. 1,703,804, dated February 26, 1929. Application for reissue filed September 17, 1929. Serial No. 393,257.

This invention relates to new and useful improvements in side sills for freight cars, principally the hopper type of freight cars whose sides are spaced the maximum distance permitted by railroad clearance lines. The present application is for a reissue of Patent No. 1,703,804, the application for which was a division of the application which eventuated in Patent No. 1,703,756, dated February 26, 1929.

A primary object of the invention is to provide a side sill of novel form and maximum strength which may be easily manufactured and associated with adjoining parts of the car construction.

A principal feature of the invention consists in constructing a side sill from an angle shaped member which is formed so as to be of substantially Z shape intermediate its ends.

Another feature of the invention consists in providing the end portions of the side sill with legs or flanges adapted to be secured to the bolsters and in providing intermediate portions of the sill with substantially vertical spaced legs or flanges to which the lower ends of the car side sheets and the upper ends of the outer hopper side sheets may be respectively fastened.

Another feature of the invention resides in providing a portion of the side sill with a downwardly and inwardly inclined web.

Other and more specific features of the invention residing in advantageous forms, combinations and relations of parts will hereinafter appear and be pointed out in the claims.

In the drawings illustrating a preferred embodiment of the invention:

Figure 1 is a diagrammatic plan view of a hopper car of the maximum width type embodying the invention.

Figure 2 is a diagrammatic side elevational view of the car illustrated in Figure 1.

Figure 3 is a fragmentary side elevational view adjacent one end of the car.

Figure 4 is an enlarged sectional view taken on line 4—4, Figure 3.

Figure 5 is an enlarged sectional view taken on line 5—5, Figure 3.

Figure 6 is an enlarged sectional view taken on line 6—6, Figure 3.

Figure 7 is a fragmentary perspective view of the side sill adjacent one of its ends.

Figure 8 is an enlarged sectional view taken on line 8—8, Figure 3.

The car chosen for purposes of illustrating the invention is described in detail in my Patent No. 1,703,756, dated February 26, 1929. Generally, it may be said to comprise side sheets 3 which are spaced the maximum distance permitted by railroad clearance lines. The side stakes 10 and 10ª which project inwardly beyond the side sheets of the car are preferably of Z shape, one flange of each being secured to the inner face of the associated side sheet. The side stakes 10 are secured to the bolsters 11, which may be of any suitable construction, while the side stakes 10ª are spaced along the car sides intermediate the bolsters.

As it is necessary to attach appurtenances, such as ladders and grab irons, to the sides of the car adjacent its ends the construction at the ends must be such that these appurtenances will not project beyond the limits defined by the side sheets, which are spaced apart a maximum distance. To accomplish this result the ends of the car are reduced or restricted and the end side sheets 8 converge inwardly from the adjacent side stakes 10 to the ends of the car, being secured at these points to the car corner posts 12. The slope sheets 34 extend downwardly from the ends of the car toward the center thereof and each may advantageously be secured to adjacent side sheets by the angle members designated A and B, respectively. The angle A is employed for connecting the slope sheets to the end side sheets 8, while the angle B is employed for connecting the slope sheets to the main side sheets 3.

Extending continuously between the bolsters are the main side sills 15. Each of these side sills preferably terminates at the bolsters, because should they extend continuously to the ends of the car it would be necessary to incline their ends inwardly to conform to the convergence of the end side sheets 8. However, extending between the bolsters and the car ends are auxiliary side sills 16 of angle shape. While these sills are connected directly to the end structure of the car, they are connected to the bolsters and side sills 15 through the intermediacy of bracket members 17. Thus, on each side of the car is a main sill 15 and two auxiliary sills 16 the latter being spaced inwardly a suitable distance from the former to extend parallel thereto and be connected to the restricted ends of the car.

Each side sill is formed with portions for attachment to the body bolsters 11, each of these portions comprising an upwardly extending leg or flange 51 adapted to be secured to one side or end of the adjoining bolster and an inwardly extending leg or flange 52 adapted to be secured to the under side or bottom of the bolster. These legs or flanges are preferably disposed at right angles to each other and the upright leg 51 is so arranged that the outer flange of the adjacent side stake 10 may be interposed between it and the bolster, as clearly shown in Figure 6.

Intermediate the bolster attaching portions, the side sill is of substantially Z shape, having oppositely extending, preferably vertical, legs or flanges $51^a$ and $52^a$ connected by a downwardly inclined web 55. This Z shaped portion of the sill may conveniently extend continuously between the points where the planes of the slope sheets 34 at opposite ends of the car respectively intersect the sill. From these points to points respectively adjacent the bolsters the Z portion of the sill changes in formation, gradually merging into the angle shaped end portions. Thus, from the points where the planes of the slope sheets intersect the side sill to points adjacent the bolsters, the upwardly extending flange $51^a$ of the Z gradually increases in height, while the inclined web 55 and the downwardly extending leg $52^a$ gradually decrease in width and depth until these portions respectively merge with the angular portions of the sills. In the portions of the sill where it changes from Z-shape to angle shape the inclined web 55 and the leg $52^a$ are separated by a horizontal portion 52′ which constitutes a continuation of the horizontal flange 52 and which decreases in width as the web increases in width.

The flange 51 of the end portions of the side sill and the flange $51^a$ of the Z shaped portion thereof are disposed in the same plane so as to form one continuously extending leg or flange which affords convenient means to which the lower edges of the side sheets 3 may be attached. The leg $52^a$ of the Z portion of the sill extends downwardly so as to afford convenient means to which the upper edges of the outer side sheets 56 of the hoppers 2 may be attached. Thus, it will be appreciated that should it become necessary to replace or repair the hopper sheets by disconnecting them from the side sill, this may be done without disturbing the connection between the sill and the side sheets 3. Furthermore, since fewer rivets are required to connect the hopper sheets to the sill than to connect the car side sheets thereto, not only does this construction of sill eliminate the necessity of disturbing the connection between the sill and car side sheets, but replacement of the hopper side sheets may be more expeditiously accomplished. It will also be appreciated that by providing the sill with oppositely projecting car side sheet and hopper side sheet attaching flanges, off-setting or flanging the sheets to effect their connection to the sill is made unnecessary.

By connecting the oppositely extending legs or flanges of the Z portion of the sill by an inclined web the interior of the car is provided with a transversely inclined surface which greatly facilitates the discharge of lading from the hopper through the hopper doors.

From the foregoing it will be perceived that the construction of the side sill is such that it may be conveniently and readily secured to the bolsters and that the car side sheets and hopper side sheets may be attached to separate portions thereof so that the latter may be readily replaced. Furthermore, the inclined web of the side sill greatly facilitates the discharge of lading through the hopper doors of the car. Although the side sill disclosed is particularly applicable to cars of maximum width and, therefore, to those having reduced ends as the hopper side sheet attaching flange of the sill is disposed inwardly of the car side sheet attaching flange and no portion of the sill projects outwardly beyond the car sides, it will be appreciated that its utility is not solely limited to cars of this particular type.

I claim:

1. A side sill whose cross section is substantially the shape of a Z throughout its greater length and whose cross section is substantially right angular at its respective ends.

2. A side sill for a freight car having end portions respectively provided with upwardly and inwardly extending legs, the portions of the sill intermediate the end portions being provided with legs and an intermediate web.

3. A side sill for a freight car having end portions respectively provided with substantially normally disposed legs, the portions of the sill intermediate the end portions being provided with oppositely extending legs and an intermediate web.

4. A side sill for a freight car, each end of which has a leg extending upwardly and a leg extending inwardly, an angularly disposed web starting from a point near one end of the sill and widening to its fullest width at a point removed from said end, said widened web extending to a point adjacent the opposite end of the sill.

5. A side sill comprising an upwardly extending leg, a downwardly extending leg, and a sloping web between said legs, said legs being respectively parallel to points adjacent the ends of the sill and said web decreasing in width and vanishing at points repectively adjacent the ends of the sill, the said legs at the ends of the sill being substantially at right angles to each other.

6. A side sill having its opposite ends provided with portions extending at right angles to each other, the said angular portions being bent to form the sill of substantially Z shape throughout its major portion.

7. A side sill, the cross section of which throughout its central portion is of substantially Z formation, the web of the Z decreasing in width at points near the opposite ends of the sill and merging with the legs thereof, one of said legs adjacent the points of mergence of the web therewith being bent so as to be at substantially right angles to the other leg.

8. A freight car comprising side sills adapted to be respectively attached to the body bolsters of the car, the bolster attaching portions of the sills being of substantially right angular formation, the major portion of each sill intermediate the bolster attaching portions being of substantially Z formation.

9. A side sill formed of a single piece of metal, the opposite ends of which are provided with legs extending at right angles to each other, the central portion of said sill being provided with substantially parallel legs connected by a web, said central portion merging with the said end portions.

10. A freight car having converging end side portions, side sills extending throughout the length of the non-converging side portions of the car, said sills changing in form from right angular formation at their ends to a formation having a web and oppositely extending legs intermediate their ends.

11. A freight car having converging end side portions, side sills extending throughout the length of the non-converging side portions of the car, the greater portions of said side sills having two legs extending in opposite directions and an inclined connecting web.

12. A freight car having parallel side sheets and side sheets converging toward the ends of the car, side sills extending along the parallel sides of the car, said sill being right angular in section at their opposite ends and flared throughout the greater part of their length to form three portions disposed in separate planes.

13. A freight car having parallel side sheets and side sheets converging toward the end of the car, side sills extending along the parallel sides of the car, each of said side sills being provided with right angular end portions and a sloping web extending between said end portions.

14. A side sill for a railway hopper car, said sill being provided with oppositely extending legs, one of said legs affording means to which the car side sheets may be attached and the other of said legs affording means to which outer side sheets of the car hoppers may be attached, the legs of said sill being connected by an inclined web portion.

15. A side sill for a railway hopper car having oppositely extending legs connected by an inclined web, one of said legs affording means to which car side sheets may be attached, the other of said legs affording means to which outer side sheets of the car hoppers may be attached, said sill being integrally formed with angularly disposed portions for attachment to the car bolsters.

16. A side sill for a railway hopper car comprising oppositely extending legs connected by an inclined web, one of said legs affording means to which the car side sheets may be attached and the other of said legs affording means to which outer side sheets of the car hoppers may be attached, said sill being integrally formed with legs extending at right angles to each other affording means to which the body bolsters of the car may be attached, one of said legs of the bolster attaching portions of the side sill constituting a continuation of the side sheet attaching leg of the sill.

17. A side sill for a railway car having a plurality of legs connected by an inclined web, one of said legs affording means to which side sheets of the car may be attached and the other of said legs affording means to which outer side sheets of the car hoppers may be attached, the inclined web of the sill being arranged so as to provide the interior of the car with a transversely inclined surface.

18. A side sill for a railway car having a plurality of substantially parallel legs connected by a web, one of said legs affording means to which the side sheets of the car may be attached and the other of said legs affordmeans to which outer side sheets of the car hoppers may be attached, the ends of said sill being respectively integrally formed with legs disposed at right angles to each other for attachment to the body bolsters of the car.

19. In a railway car having side sheets and a plurality of hoppers, the combination with side sills respectively having a plurality of legs connected by an inclined web, said side sheets being secured to one leg of each sill and the outer side sheets of adjacent hoppers being secured to the other leg of the sill, the inclined webs of the sills providing the interior of the car with transversely inclined surfaces.

20. In a railway car having side sheets and a plurality of hoppers, the combination with side sills respectively having a plurality of legs connected by an inclined web, said side sheets being secured to one leg of each sill and the outer side sheets of adjacent hoppers being secured to the other leg of the sill, the inclined webs of the sills providing the interior of the car with transversely inclined surfaces, each of said sills being integrally formed with angularly disposed portions adapted to be secured to the body bolsters of the car.

21. A railway freight car involving a side sill provided with a substantially vertical portion for attachment to the car sides and with a portion extending downwardly and inwardly therefrom.

22. A side sill for a freight car provided with substantially right angular end portions and with a relatively inclined portion extending between said end portions.

23. In a railway freight car, the combination with body bolsters, of side sills respectively having portions attached to said bolsters, each of said sills being provided with a downwardly and inwardly inclined portion extending between the bolster attaching portions thereof.

WILLIAM E. WINE.